United States Patent Office 2,872,459
Patented Feb. 3, 1959

2,872,459

PROCESS FOR THE PREPARATION OF DIBENZANTHRONE

Arthur A. Baum, Wilmington, Del., assignor to E. I. du Pont de Nemours and Company, Wilmington, Del., a corporation of Delaware No Drawing. Application February 28, 1956
Serial No. 568,158

10 Claims. (Cl. 260—357)

This invention is directed to an improvement in the manufacture of dibenzanthrone by the caustic fusion of benzanthrone. The discovered improvement lies in the use of an alcohol-ether type solvent, such as glycol monoethyl ether ("Cellosolve") as the diluent or flux for the concentrated caustic fusion mass.

Numerous problems exist in the manufacture of dibenzanthrone by caustic fusion of benzanthrone, such as effecting complete caustic fusion of benzanthrone to dibenzanthrone at temperatures lower than those currently used in practice, and, the need of eliminating the special separation difficulties associated with the isolation of high quality dibenzanthrone from fusion masses containing diluents, such as naphthalene or kerosene, or highly flammable solvents, such as solvent naphtha or large amounts of methanol. An additional problem is the one of producing concentrated fusion masses sufficiently fluid in character to insure elimination of off-quality charges.

The caustic fusion of benzanthrone to dibenzanthrone is effected at temperatures up to 210° C. utilizing high boiling solvents, such as aniline, naphthalene, kerosene, and high boiling solvent naphthas. It is preferred in this commercial process to concentrate the reaction masses as much as possible for reasons of efficiency and economy; however, when the fusion process of forming dibenzanthrone is conducted in this concentrated form in the presently used solvents, extreme difficulty is encountered in maintaining satisfactory quality of the dibenzanthrone end product. The use of oxidizing agents in the benzanthrone fusion reaction is well known. U. S. Patents 1,993,667 and 1,993,668 describe processes which are among the best known in current use. These patents disclose the ordinary fusion conditions of the prior art including choice of solvents, temperatures, concentrations, choice of oxidizing agents, and the like.

It is an object of this invention to complete the formation of high quality dibenzanthrone at a temperature much lower than that which is presently used by utilizing an alcohol-ether type solvent. It is a further object of the present invention to effect excellent yields of dibenzanthrone with the use of water-soluble solvents which are readily separated from the final dye.

More specifically, the present invention is directed to an improvement in the caustic fusion of benzanthrone to form dibenzanthrone which improvement comprises performing the reaction in the presence of a solvent selected from the group consisting of mono-alkyl-ethers of the ethylene and diethylene glycols, said alkyl radicals containing from 1 to 4 carbon atoms.

The following examples are illustrative of the present invention:

Example 1

To 250 parts of 2-ethoxyethanol-1 (hereinafter referred to as "Cellosolve") were added 250 parts of flake potassium hydroxide. The solution was heated to 120° C. and 9.6 parts of sodium chlorate added followed by 104 parts of benzanthrone. The mixture was then heated slowly to 187° C. over a period of 5 hours. The "Cellosolve" was then removed by distillation with the simultaneous addition of water at the same rate that the "Cellosolve" was taken off. The vapor temperature was maintained at 104 to 114° C. with a pot temperature of 115 to 145° C. In this manner the "Cellosolve" was removed in 1½ hours. The solution of dye was then drowned in 6,000 parts of cold water. The resulting dye slurry was heated to 80° C. and sodium hydroxide and sodium hydrosulfite added to completely reduce the dye. The vat solution was then filtered. The clarified vat solution was blown with air to precipitate the dye. The resulting slurry was filtered and washed free of alkali. A small amount of the condensation product of formaldehyde and naphthalene sulfonic acid (a dispersing agent) was added to the dye cake which was then milled to give a stable paste. The dye obtained was of good strength and fastness.

Example 2

To a mixture of 150 parts of "Cellosolve" and 150 parts of flake potassium hydroxide were added at 123° C. 9.6 parts of sodium chlorate and 103.2 parts of benzanthrone. The mixture was then heated to 150° C. in 2 hours and held at 150 to 160° C. with agitation for 3½ hours. The crude reaction product was poured into 2,000 parts of water. The slurry was blown with air at 70 to 80° C. to oxidize the dye which comes out of the reaction in a reduced state. The slurry of oxidized dye was then bleached by adding sodium hypochlorite sufficient to hold a positive test on starch-iodide paper while stirring for 6 hours at 70 to 80° C. The dye was then isolated by filtration and washing. The filter cake was made up to a stable paste by the addition of an anionic dispersing agent and milling. A strong dye of good wash-fastness was obtained.

Example 3

To a mixture of 120 parts of "Cellosolve," 30 parts methyl alcohol, and 150 parts of flake potassium hydroxide were added at 120° C., 9.6 parts of sodium chlorate and 104.8 parts of benzanthrone. The mixture was heated to 150° C. in 2 hours and then stirred at 145 to 155° C. for 2½ hours. The reaction product was drowned in 7,000 parts of water. Sufficient sodium hydrosulfite was then added to complete the reduction of the dye. The vat solution was filtered and the clarified solution of the vat was oxidized by air blowing. The dye was isolated by filtration, washing and milling to a paste with dispersing agent; said dye was of excellent strength and possessed good wash-fastness properties.

Example 4

To a mixture of 180 parts of "Cellosolve," 45 parts methyl alcohol, and 225 parts of potassium hydroxide at 120° C. were added 28.8 parts of sodium chlorate and 157.3 parts of benzanthrone. The mixture was heated in 1½ hours to 140° C. and then stirred at 140 to 150° C. for 3½ hours. The reaction product was drowned in water, blown with air, filtered, washed, and converted to a paste as usual.

Example 5

To a mixture of 150 parts of the mono-butyl-ether of diethylene glycol and 150 parts of potassium hydroxide were added at 120° C. 15.4 parts of sodium chlorate and 100 parts of benzanthrone. The mixture was heated to 140° C. in 2 hours and then stirred at 140 to 150° C. for 2½ hours. The reaction product was drowned in 3,000 parts of water, blown with air to oxidize, filtered, and washed free of caustic. The wet cake was milled with dispersing agent to yield the dye paste.

Example 6

To a mixture of 150 parts of the mono-butyl-ether of ethylene glycol and 150 parts of potassium hydroxide at 120° C. were added 15.4 parts of sodium chlorate and 100 parts of benzanthrone. The mixture became very thick so an additional 100 parts of the butyl ether of ethylene glycol were added. This gave a thin mixture which was heated to 150° C. in 3½ hours. The mixture was then stirred for 1 hour at 155 to 175° C. The reaction product was drowned in 3,000 parts of water, blown with air, filtered and washed free of caustic. The crude dye was milled with dispersing agent to give a stable paste.

Example 7

To 150 parts of the mono-methyl-ether of ethylene glycol and 150 parts potassium hydroxide were added at 120° C. 15.4 parts of sodium chlorate and 100 parts of benzanthrone. The mixture was heated to 145° C. in 4½ hours and then stirred at 145 to 150° C. for 2 hours. The charge was drowned in 3,000 parts of water, blown with air to oxidize, filtered, washed free of caustic, and made up to a stable paste by milling with dispersing agent.

Example 8

To 120 parts of "Cellosolve," 30 parts of methyl alcohol, and 150 parts of potassium hydroxide were added at 120° C. 17.7 parts of potassium chlorate and 100 parts of benzanthrone. The mixture was heated to 145° C. in 4 hours and then stirred at 145 to 150° C. for 2½ hours. The product was drowned in 3,000 parts of water, blown with air to oxidize, filtered, washed free of caustic, and milled with a dispersing agent.

Example 9

To 120 parts of "Cellosolve," 30 parts of methyl alcohol, 135 parts of potassium hydroxide, and 15 parts of sodium hydroxide at 120° C. were added 10 parts of sodium chlorate and 100 parts of benzanthrone. The mixture was heated to 145° C. in 1 hour and then stirred at 145 to 150° C. for 3 hours. The product was drowned in 3,000 parts of water, blown with air to oxidize, filtered, washed free from caustic, and milled with dispersing agent.

Example 10

To 120 parts of "Cellosolve," 30 parts of methyl alcohol, 120 parts of potassium hydroxide, and 30 parts of sodium hydroxide were added at 120° C. 10 parts of sodium chlorate and 100 parts of benzanthrone. The mixture was heated in 2 hours to 145° C. and then stirred for 2 hours at 145 to 150° C. The reaction product was drowned in 3,000 parts of water, blown with air to oxidize, filtered, washed free of caustic, and milled with dispersing agent.

Example 11

To a mixture of 120 parts of "Cellosolve," 30 parts of methyl alcohol, and 200 parts of potassium hydroxide at 120° C. were added 10 parts of sodium chlorate and 100 parts of benzanthrone. The mixture was heated in 2½ hours to 170° C. and then stirred for 2 hours at 170 to 180° C. The product was drowned in 3,000 parts of water, blown with air to oxidize, filtered, washed free of caustic, and converted to a stable paste by milling with dispersing agent.

Example 12

To a mixture of 120 parts of "Cellosolve," 30 parts of methyl alcohol, 10 parts of water, and 150 parts of potassium hydroxide at 120° C. were added 10 parts of sodium chlorate and 100 parts of benzanthrone. The mixture was heated in 3 hours to 145° C. at which point mild refluxing occurred. The mixture was then heated at reflux for 2 hours at approximately 145° C. The charge was drowned in 3,000 parts of water, blown with air to oxidize, filtered, washed free of caustic, and milled with dispersing agent.

Example 13

To a mixture of 120 parts of "Cellosolve," 30 parts of denatured ethyl alcohol, and 150 parts of potassium hydroxide at 120° C. were added 10 parts of sodium chlorate and 100 parts of benzanthrone. The mixture was heated to 145° C. in 1 hour and then stirred at 145 to 150° C. for 2½ hours. The product was drowned in 3,000 parts of water, blown with air to oxidize, filtered, washed neutral, and milled with dispersing agent.

Example 14

Example 13 was repeated using 30 parts of isopropyl alcohol in place of the 30 parts of denatured ethyl alcohol.

Example 15

Example 13 was repeated using 30 parts of normal butyl alcohol in place of the 30 parts of denatured ethyl alcohol and using a reaction temperature of 160 to 170° C. in place of 145 to 150° C.

Example 16

To a mixture of 120 parts of "Cellosolve," 30 parts of methyl alcohol, and 150 parts of potassium hydroxide at 120° C. were added 22.8 parts of potassium nitrate and 100 parts of benzanthrone. The mixture was heated to 145° C. in 2 hours and then stirred for 2 hours at 145 to 150° C. The product was drowned in 3,000 parts of water, blown with air to oxidize, filtered, washed neutral, and milled with dispersing agent.

Example 17

To a mixture of 120 parts of "Cellosolve," 30 parts of methyl alcohol, and 150 parts of potassium hydroxide at 120° C. were added 15 parts of sodium chlorate and 120 parts benzanthrone. The mixture was heated to 145° C. in 2 hours and then stirred for 2 hours at 145 to 150° C. The product was drowned in 3,000 parts of water, blown with air to oxidize, and bleached by heating for 6 hours at 85 to 90° C. maintaining excess sodium hypochlorite during the bleaching period. The product was filtered, washed free of caustic and milled with dispersing agent.

The resulting dyes of Examples 4–17 reflected good strength and wash-fastness properties.

Examples 2, 3 and 17 disclose that less than 1.5 parts of the alcohol diluent per part of benzanthrone may be used successfully. It is obvious that the successful use of such a short volume has a definite economic advantage. However, large amounts of diluent may be used as is shown in Example 1 wherein about 2.5 parts are employed.

The use of lower fusion temperatures than those normally employed is illustrated in the examples. The highest temperature disclosed is 187° C. in Example 1 and in this example the fusion was terminated as soon as 187° C. was reached. The reaction is slow at temperatures materially lower than 140° C.

Suitable oxidizing agents are those normally employed in the benzanthrone fusion reaction, e. g., potassium and sodium chlorates, potassium nitrate, and sodium nitrite.

For use as a vat dye, dibenzanthrone must be prepared in adequately dispersed form. This may be done in a number of ways among which are the following: (a) the crude dye is dissolved in an alkaline hydrosulfite vat, the vat solution clarified, and the dye precipitated by air oxidation, followed by filtration and washing. The resulting dye filter cake is converted into a stable paste by simple admixture with a dispersing agent, and (b) the crude dye is milled, as in a ball mill or colloid mill, in the presence of a dispersing agent.

The significance of the present invention, as disclosed, resides in the use of reduced temperature of fusion as a result of the use of an alcohol-ether type solvent as diluent which results in a decrease in hazards of handling high temperature caustic masses, decreased formation of by-product, the elimination of separation difficulties normally encountered upon completion of the fusion reaction and the consistent reproducibility of quality and yield of the resulting dibenzanthrone.

I claim:

1. In the process of forming dibenzanthrone by caustic fusion of benzanthrone in the presence of an oxidizing agent, the improvement which comprises performing said caustic fusion reaction in the presence of a mono-alkyl-ether solvent derived from a glycol taken from the group consisting of the ethylene and diethylene glycols, said alkyl radical containing 1 to 4 carbon atoms.

2. In the process of forming dibenzanthrone by caustic fusion of benzanthrone in the presence of an oxidizing agent, the improvement which comprises performing said caustic fusion reaction in the presence of a mono-alkyl-ether solvent derived from a glycol taken from the group consisting of ethylene and diethylene glycols, said solvent containing up to 25% of an alcohol containing not more than 4 carbon atoms, said alkyl radical containing 1 to 4 carbon atoms.

3. In the process of forming dibenzanthrone by caustic fusion of benzanthrone in the presence of an oxidizing agent, the improvement which comprises performing said caustic fusion reaction in the presence of glycol mono-ethyl-ether as solvent.

4. In the process of forming dibenzanthrone by caustic fusion of benzanthrone in the presence of an oxidizing agent, the improvement which comprises performing said caustic fusion reaction in the presence of glycol mono-methyl-ether as solvent.

5. In the process of forming dibenzanthrone by caustic fusion of benzanthrone in the presence of an oxidizing agent, the improvement which comprises performing said caustic fusion reaction with potassium hydroxide in the presence of from at least about 1.2 parts of a mono-alkyl-ether solvent derived from a glycol taken from the group consisting of the ethylene and diethylene glycols per part of benzanthrone, said alkyl radical containing 1 to 4 carbon atoms, within the temperature range of 130 to 180° C.

6. The process of claim 5 conducted within the temperature range of 145 to 150° C.

7. In the process of forming dibenzanthrone by caustic fusion of benzanthrone in the presence of an oxidizing agent, the improvement which comprises performing said caustic fusion reaction with potassium hydroxide in the presence of from about 1.5 to 3 parts of 2-ethoxyethanol-1 per part benzanthrone within the temperature range of 130 to 180° C.

8. The process of claim 7 conducted within the temperature range of 145 to 150° C.

9. In the process of forming dibenzanthrone by caustic fusion of benzanthrone in the presence of an oxidizing agent, the improvement which comprises performing said caustic fusion reaction with potassium hydroxide in the presence of about 1.2 parts 2-ethoxyethanol-1 and 0.3 part methanol per part of benzanthrone within the temperature range of 130 to 180° C.

10. The process of claim 9 conducted within the temperature range of 145 to 150° C.

References Cited in the file of this patent

UNITED STATES PATENTS

| 1,993,667 | Howell | Mar. 5, 1935 |
| 2,716,124 | Straley et al. | Aug. 23, 1955 |

OTHER REFERENCES

The Condensed Chemical Dictionary, 3rd ed., Reinhold Publ. Co., 1942, pp. 171 and 433.